B. C. BALL.
DEMOUNTABLE TIRE RIM.
APPLICATION FILED JULY 7, 1910.
999,086.
Patented July 25, 1911.
2 SHEETS—SHEET 1.
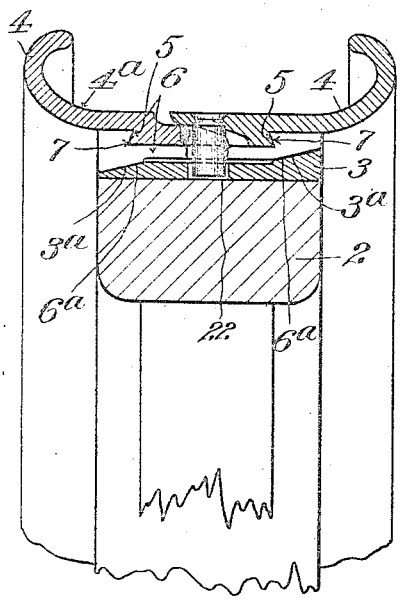
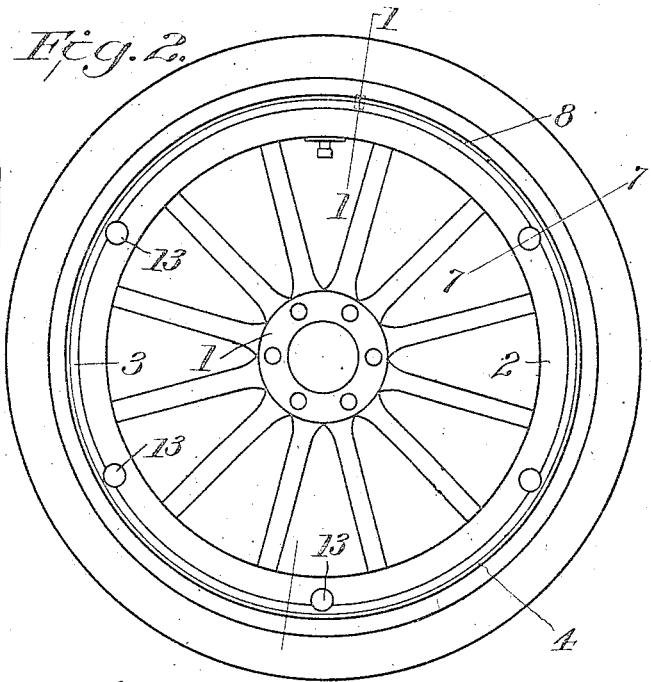
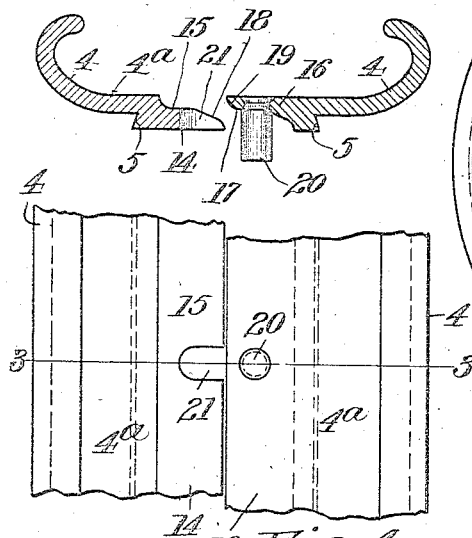
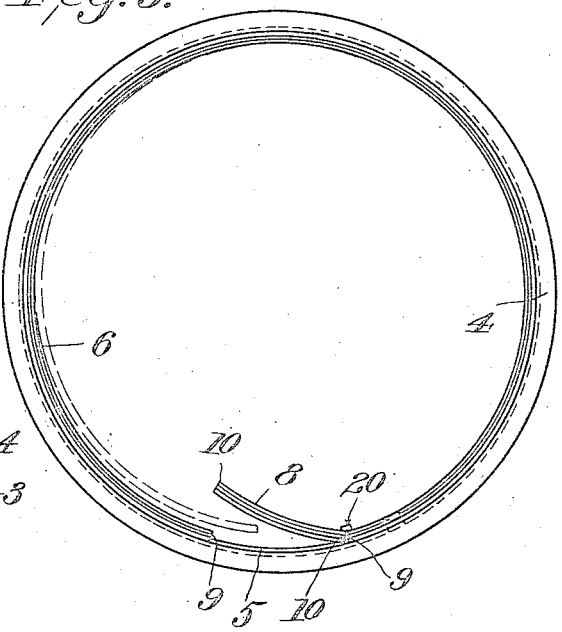
Witnesses
A. M. Parking
M. B. Morris
Inventor
Bert C. Ball
by H. C. Lord
Attorney

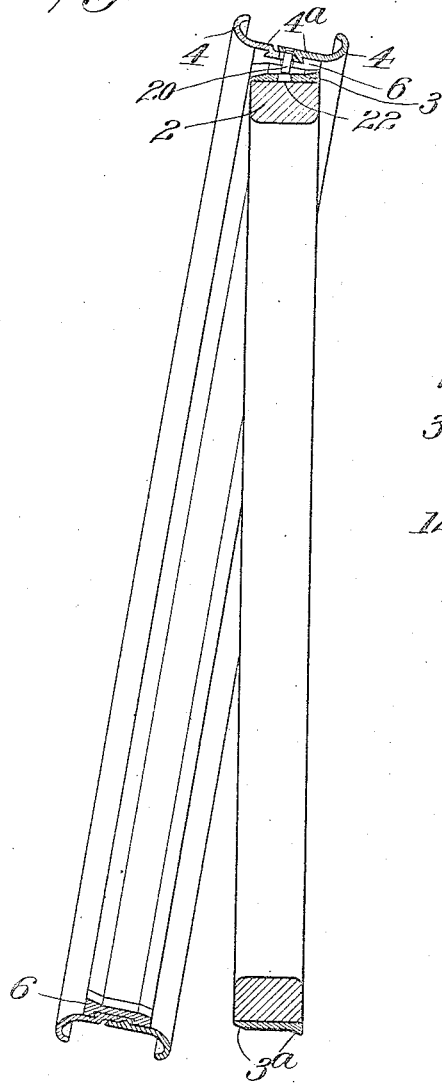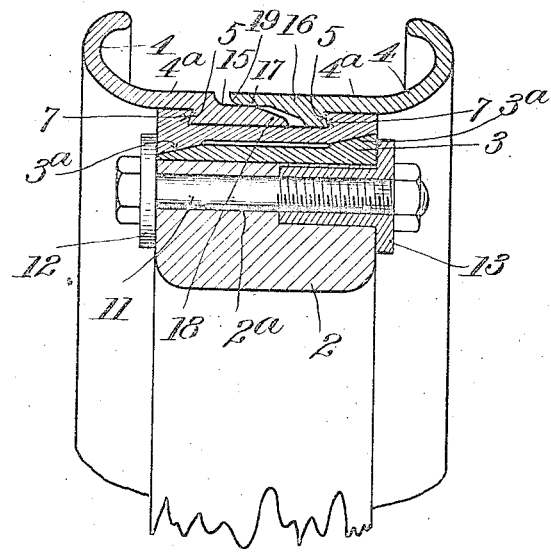

UNITED STATES PATENT OFFICE.

BERT C. BALL, OF PORTLAND, OREGON.

DEMOUNTABLE TIRE-RIM.

999,086.

Specification of Letters Patent. Patented July 25, 1911.

Application filed July 7, 1910. Serial No. 570,861.

*To all whom it may concern:*

Be it known that I, BERT C. BALL, a citizen of the United States, residing at Portland, in the county of Multnomah and State of Oregon, have invented new and useful Improvements in Demountable Tire-Rims, of which the following is a specification.

This invention relates to demountable tire rims, and consists in certain improvements in the construction thereof as will be hereinafter fully described and pointed out in the claims.

The invention is particularly advantageous where it is desired to carry a tire on the rim in an inflated condition. In addition to this, the present constructon is such that the tire itself may be quickly and readily detached from the rim, so that, in this sense, the invention relates to a separable rim.

The invention is illustrated in the accompanying drawings as follows:

Figure 1 shows a section on the line 1—1 in Fig. 2. Fig. 2 shows a side elevation of the wheel with the tire in place thereon. Fig. 3, a section on the line 3—3 in Fig. 4, showing the rim parts separated. Fig. 4, a view of a fragment of the rim parts, the view being from the interior of the rim. Fig. 5, a side elevation of the rim, showing the method of separating the rim parts to detach the tire. Fig. 6, a transverse section through the wheel felly and rim, showing the manner of placing the tire rim on the felly. Fig. 7 is a section on the line 7—7 in Fig. 2.

1 marks the wheel and 2 the wheel felly. A fixed rim 3 is secured to the felly in the usual manner. It has the tapered surfaces 3ª—3ª. The tire rim 4 may be of any form, but as shown is of the clencher type. It is separated circumferentially, and has the shoulders 5 arranged on its inner periphery. A locking ring 6 is, when the rim is in place, arranged on the inner periphery of the rim parts 4. It has an annular groove, the walls of which form the shoulders 7 adapted to engage the shoulders 5 on the rim parts. These shoulders 5 and 7 are preferably undercut, so that when the locking ring is in place in the rim, and the tire inflated, the pressure of the tire on the shoulders holds the rims securely in place. The locking ring is separated transversely, and it is preferably of slightly less length than sufficient to fill the entire inner periphery of the rim parts. The distance between the ends is preferably such that when the two ends of the locking ring are brought together the ring is so far collapsed as to permit of its ready removal from the rim parts. A filling piece 8 of the same cross section as the locking ring is snapped into place between the ends of the locking ring when the locking ring is in place. The ends 9 of the locking ring are preferably undercut slightly. This may be accomplished by making the ends exactly radial, and the ends 10 of the filling piece 8 are cut to conform to the ends of the ring. The filling piece is of such length that by pressure it can be forced between the ends of the ring, and, when once snapped in place, is held in place by the undercut portions, even before the tire is inflated. This use of the filler facilitates very greatly the removal and the reassembling of the parts. The locking ring has the beveled surface 6ª on its inner periphery, conforming to the beveled surface 3ª on the fixed rim. These tapered surfaces extend in the same direction, that is, permit of the locking ring being moved axially from the side of the fixed rim to place on the wheel rim. The bolts 11 extend through perforations 2ª in the felly. They are provided with the heads 12 which engage the locking ring, and they are screwed into the socket nuts 13 secured in the felly. By simply setting up these bolts the locking ring is forced onto the wheel rim, and thus wedged out against the tire rim, locking and centering the whole securely.

One of the rim parts is provided with a lip 14, the outer surface 15 of which is of less diameter than the tire base 4ª on the rim. The opposite tire rim part has a lip 16, the inner surface 17 having a diameter equal to the diameter of the surface 15. These lips have the tapered edges 18 and 19, so that one rim part may be readily forced onto the other. These tapered edges of the lips on the rim parts facilitate the detaching of the tire, and the reassembling of the rim very greatly because with the tire in place the lip 14 will not otherwise readily enter. With the tapered surface, however, the parts are readily brought into engagement and the inner lip made to enter the outer lip perfectly. These overlapping lips not only center one part of the rim with relation to the other, but they protect the tire from any injury which might be incident to any opening directly through the rim parts. They are so proportioned as to permit of the rim parts being moved together telescopically sufficiently to allow the placing of the locking ring on the shoulders 5—5 and then allow the outward movement of the rim parts necessary to bring into engagement the undercut shoulders without forming an opening at the center of the rim.

I prefer to provide a dowel 20. This is secured in the lip 16. A notch 21 is arranged in the lip 14 which permits of the slipping of the lip 14 into the lip 16. The dowel extends into a perforation 22 in the wheel rim. The dowel is preferably arranged adjacent to the opening for the tire valve stem, as indicated in Fig. 2, and is also preferably arranged so as to be at one end of the locking ring, as clearly shown in Fig. 5. Where this is so, this end of the locking ring may be located on the dowel pin, and also readily placed over the valve stem. The part of the locking ring remaining may very readily be run around into place.

It is essential to the quick operation of this device that the shoulders 5 and 7 have such continuity that the locking ring may be slipped along the shoulder in its collapsing movement and also so that in assembling the parts having positioned one end of the ring the other parts may be brought together by the action of the ring itself against the edges of the shoulder. Where this continuity is lacking it is difficult to hold the parts in place while running the locking ring onto the rim parts.

It will be noted that the undercut shoulders securely bind the parts together under the influence of the pressure in the tire. This is particularly desirable while the tire and rim are demounted. On the other hand, the wedging action of the surfaces on the wheel rim and interior of the locking ring securely lock the parts together, regardless of whether there is pressure in the tire when the tire and rim are mounted. This is particularly desirable because it prevents the separation of the parts in case of puncture or accidental deflation of the tire.

By carrying the rim parts inwardly to the center and preferably past the center by reason of the overlap a large surface is subjected to tire pressure in a radial direction relatively to the wheel. This width of rim and the flanges formed by the overlap inside the shoulders also stiffens the rim parts so that light material may be used without danger of the tire shoulders on the rim turning or springing so as to release the tire.

It will be noted that with the annular undercut shoulder on the locking ring and flanges or surfaces extending outwardly from said shoulder forming bases on which the rim parts rest, the rim parts, being hooked, as it were, in the undercut grooves, are braced by the outwardly extending flanges on the locking ring so that the collapsing of the rim parts can only be effected by the crimping in of these outwardly extending flanges. Furthermore, when the locking ring is used as part of the demounting scheme, these flanges give the metal for the tapered surfaces. The flanges formed by the overlap and the flanges formed outside shoulders on the locking ring can be given a more uniform and effective width as to both rim parts and locking ring when the shoulders are some distance from the center of the rim and at each side of the center of the rim. This bracing of one part upon the other and arranging and shaping the parts with relation to the direction of strain is of great importance, in that it permits of greatly reducing the weight and at the same time giving great strength in the direction of strain.

The locking ring is preferably turned or machined to the exact diameter of the fixed rim so that the shoulders come into engagement accurately throughout the length of the rim.

What I claim as new is:

1. In a demountable tire rim, the combination of a two part rim separated circumferentially, each part having an annular undercut shoulder on its inner periphery; a locking ring separated transversely, and having annular undercut shoulders to receive the undercut shoulders of the rim; and means for securing the locking ring on the wheel.

2. In a demountable tire rim, the combination of a two part rim separated circumferentially, each part having an annular undercut shoulder on its inner periphery; a locking ring separated transversely, and having annular undercut shoulders to receive the undercut shoulders of the rim, said locking ring being of less length than the full circumference of the inner periphery of the rim parts; a filling piece adapted to be put in place after the ring is in place completing the locking ring; and means for securing the locking ring on the wheel.

3. In a demountable tire rim, the combination of a two part rim separated circumferentially, each part having an annular undercut shoulder on its inner periphery; a locking ring separated transversely, and having annular undercut shoulders to receive the undercut shoulders of the rim, said locking ring being of less length than the full circumference of the inner periphery of the rim parts; a filling piece adapted to be put in place after the ring is in place completing the locking ring, the ends of the locking ring being undercut, and the ends of the filling piece formed to engage the undercut ends of the locking ring.

4. In a demountable tire rim, the combination of a two part tire rim separated circumferentially, each part having an annular undercut shoulder on its inner periphery, one of said parts having an annular lip; an overlapping lip centered on the other rim part, and overlapping said lip and closing the base of the rim parts when moved to normal position; a locking ring separated transversely, and having an annular undercut shoulder to receive the undercut shoulder of the rim parts; and means for securing the ring on the wheel.

5. In a demountable tire rim, the combination of a two part tire rim separated circumferentially, each part having an annular undercut shoulder on its inner periphery and each having an annular lip for telescoping the other; a locking ring having undercut shoulders engaging the shoulders of the rim parts; a dowel pin secured to one lip extending through the other, and into the locking ring; and means for securing the locking ring to the wheel.

6. In a demountable tire rim, the combination of a two part rim separated circumferentially, each part having an annular shoulder on its inner periphery, and telescoping lips; a locking ring separated transversely, and having annular undercut shoulders to receive the undercut shoulders on the rim parts and a dowel pin secured to one of said lips extending through the other of said lips, and through said locking ring adjacent to one of the ends thereof.

7. In a demountable tire rim, the combination of a tire rim separated circumferentially, each part having an annular undercut shoulder on its inner periphery; and a locking ring separated transversely and having annular undercut shoulders thereon to receive the shoulders on the rim parts, the shoulders being at each side of the center of the rim.

8. In a demountable tire rim, the combination of a tire rim separated circumferentially, each part having an annular undercut shoulder on its inner periphery; and a locking ring separated transversely and having annular undercut shoulders thereon to receive the shoulders on the rim parts, the shoulders on the ring having flanges extending laterally from the shoulders forming supporting bases for the rim parts.

9. In a demountable tire rim, the combination of a tire rim separated circumferentially, each part having an annular undercut shoulder on its inner periphery, each part having an inwardly extending lip, said lips overlapping; and a locking ring separated transversely and having annular undercut shoulders to receive the shoulders on the rim parts, said ring being provided with flanges extending laterally from the shoulders on the ring forming bases and supports for the rim parts.

In testimony whereof I have hereunto set my hand in the presence of two subscribing witnesses.

BERT C. BALL.

Witnesses:
H. C. LORD,
A. M. PARKINS.